US007032008B2

(12) United States Patent
Anderson et al.

(10) Patent No.: US 7,032,008 B2
(45) Date of Patent: Apr. 18, 2006

(54) SYSTEM FOR ON-LINE FINANCIAL SERVICES USING DISTRIBUTED OBJECTS

(75) Inventors: William P. Anderson, Kansas City, MO (US); Jacob B. Geller, Montclair, NJ (US)

(73) Assignee: Block Financial Corporation, Kansas City, MO (US)

( * ) Notice: Subject to any disclaimer, the term of this patent is extended or adjusted under 35 U.S.C. 154(b) by 661 days.

(21) Appl. No.: 09/932,373

(22) Filed: Aug. 17, 2001

(65) Prior Publication Data

US 2001/0056475 A1 Dec. 27, 2001

Related U.S. Application Data

(63) Continuation of application No. 09/520,140, filed on Mar. 7, 2000, now Pat. No. 6,426,742, which is a continuation of application No. 08/902,239, filed on Jul. 29, 1997, now Pat. No. 6,131,115, which is a continuation of application No. 08/580,074, filed on Dec. 20, 1995, now Pat. No. 5,706,442.

(51) Int. Cl.
*G06F 15/16* (2006.01)

(52) U.S. Cl. ................................... 709/217

(58) Field of Classification Search ............... 709/217, 709/207; 382/100, 137; 364/408; 359/616; 707/200, 104.4, 104.1; 395/650, 616; 719/320; 379/93.19; 705/14, 35, 36, 40, 79; 713/200; 710/1

See application file for complete search history.

(56) References Cited

U.S. PATENT DOCUMENTS

| 4,346,442 | A | 8/1982 | Musmanno | 364/408 |
|---|---|---|---|---|
| 4,727,243 | A | 2/1988 | Savar | 235/379 |
| 4,823,122 | A | 4/1989 | Mann et al. | 340/825.28 |
| 4,975,904 | A | 12/1990 | Mann et al. | 370/85.1 |
| 4,975,905 | A | 12/1990 | Mann et al. | 370/85.1 |
| 5,058,108 | A | 10/1991 | Mann et al. | 370/85.1 |
| 5,136,716 | A | 8/1992 | Harvey et al. | 395/800 |
| 5,187,787 | A | 2/1993 | Skeen et al. | 395/600 |
| 5,195,130 | A * | 3/1993 | Weiss et al. | 379/93.19 |
| 5,220,501 | A | 6/1993 | Lawlor et al. | 364/408 |
| 5,230,048 | A | 7/1993 | Moy | 395/600 |
| 5,257,369 | A | 10/1993 | Skeen et al. | 395/650 |
| 5,283,829 | A | 2/1994 | Anderson | 380/24 |
| 5,336,870 | A | 8/1994 | Hughes et al. | 235/379 |
| 5,339,392 | A | 8/1994 | Risberg et al. | 395/161 |
| 5,351,186 | A | 9/1994 | Bullock et al. | 364/401 |
| 5,383,113 | A | 1/1995 | Kight et al. | 395/240 |
| 5,404,523 | A | 4/1995 | DellaFera et al. | 395/650 |
| 5,425,028 | A | 6/1995 | Britton et al. | 370/94.1 |
| 5,434,974 | A | 7/1995 | Loucks et al. | 395/200 |
| 5,437,029 | A | 7/1995 | Sinha | 395/600 |

(Continued)

OTHER PUBLICATIONS

Reardon et al. Novell's Dictionary of Networking Copyright 1994.*

(Continued)

*Primary Examiner*—Vijay Shankar
*Assistant Examiner*—Prabodh Dharia
(74) *Attorney, Agent, or Firm*—Standley Law Group LLP

(57) ABSTRACT

A system is disclosed for accessing recent financial information from various financial services providers. The system is based on a client/server architecture so that services are accessible from a variety of presentation tools. Communications between clients and servers are accomplished using "Interfaces" that group operations and attributes for various services. The system uses the TCP/IP protocol suite so financial services are available at any time and from any location.

44 Claims, 3 Drawing Sheets

U.S. PATENT DOCUMENTS

| | | | | |
|---|---|---|---|---|
| 5,455,903 | A | | 10/1995 | Jolissaint et al. ............ 395/155 |
| 5,457,797 | A | * | 10/1995 | Butterworth et al. ........ 719/320 |
| 5,485,370 | A | * | 1/1996 | Moss et al. .................. 709/217 |
| 5,528,490 | A | | 6/1996 | Hill ............................. 364/403 |
| 5,535,407 | A | | 7/1996 | Yanagawa et al. ........... 395/800 |
| 5,570,465 | A | | 10/1996 | Tsakanikas .................. 395/114 |
| 5,590,133 | A | | 12/1996 | Billstrom et al. ............ 370/349 |
| 5,590,197 | A | | 12/1996 | Chen et al. ..................... 380/24 |
| 5,611,052 | A | | 3/1997 | Dykstra et al. .............. 395/238 |
| 5,644,727 | A | * | 7/1997 | Atkins .......................... 705/40 |
| 5,659,731 | A | | 8/1997 | Gustafson ................... 395/604 |
| 5,668,952 | A | | 9/1997 | Slane ..................... 395/200.75 |
| 5,671,279 | A | * | 9/1997 | Elgamal ........................ 705/79 |
| 5,678,046 | A | * | 10/1997 | Cahill et al. ................. 707/200 |
| 5,696,965 | A | | 12/1997 | Dedrick ....................... 395/610 |
| 5,701,451 | A | | 12/1997 | Rogers et al. .............. 395/600 |
| 5,706,434 | A | | 1/1998 | Kremen et al. ......... 395/200.09 |
| 5,706,442 | A | | 1/1998 | Anderson et al. ............ 395/227 |
| 5,708,825 | A | | 1/1998 | Sotomayor .................. 395/762 |
| 5,727,158 | A | | 3/1998 | Bouziane et al. ....... 395/200.55 |
| 5,729,689 | A | | 3/1998 | Allard et al. ........... 395/200.58 |
| 5,745,654 | A | | 4/1998 | Titan ............................. 395/22 |
| 5,749,075 | A | | 5/1998 | Toader et al. .................. 705/14 |
| 5,754,850 | A | | 5/1998 | Janssen ....................... 395/615 |
| 5,758,351 | A | * | 5/1998 | Gibson et al. ............ 707/104.1 |
| 5,797,133 | A | | 8/1998 | Jones et al. ................... 705/38 |
| 5,812,776 | A | | 9/1998 | Gifford .................. 395/200.47 |
| 5,832,100 | A | * | 11/1998 | Lawton et al. .............. 382/100 |
| 5,842,185 | A | | 11/1998 | Chancey et al. .............. 705/40 |
| 5,852,811 | A | * | 12/1998 | Atkins .......................... 705/36 |
| 5,870,721 | A | | 2/1999 | Norris .......................... 705/38 |
| 5,878,215 | A | * | 3/1999 | Kling et al. ................. 709/207 |
| 5,878,403 | A | | 3/1999 | DeFrancesco et al. ........ 705/38 |
| 5,892,900 | A | * | 4/1999 | Ginter et al. ................ 713/200 |
| 5,911,136 | A | * | 6/1999 | Atkins .......................... 705/36 |
| 5,924,082 | A | | 7/1999 | Silverman et al. ............ 705/37 |
| 5,940,811 | A | | 8/1999 | Norris .......................... 705/38 |
| 5,966,699 | A | | 10/1999 | Zandi ........................... 705/38 |
| 5,987,454 | A | * | 11/1999 | Hobbs ........................... 707/4 |
| 5,995,947 | A | | 11/1999 | Fraser et al. ................... 705/38 |
| 6,009,415 | A | * | 12/1999 | Shurling et al. ............... 705/35 |
| 6,014,645 | A | | 1/2000 | Cunningham ................ 705/38 |
| 6,023,684 | A | | 2/2000 | Pearson ........................ 705/35 |
| 6,026,430 | A | * | 2/2000 | Butman et al. .............. 709/203 |
| 6,108,641 | A | * | 8/2000 | Kenna et al. .................. 705/35 |
| 6,131,115 | A | | 10/2000 | Anderson et al. ........... 709/217 |
| 6,199,077 | B1 | | 3/2001 | Inala et al. .................. 707/501 |
| 6,278,993 | B1 | | 8/2001 | Kumar et al. ................... 707/3 |
| 6,317,783 | B1 | | 11/2001 | Freishtat et al. ............. 709/218 |
| 6,424,951 | B1 | * | 7/2002 | Shurling et al. .............. 705/14 |
| 2003/0233328 | A1 | * | 12/2003 | Scott et al. .................... 705/50 |
| 2005/0044280 | A1 | * | 2/2005 | Reisman ........................ 710/1 |
| 2005/0049924 | A1 | * | 3/2005 | DeBettencourt et al. ...... 705/21 |

OTHER PUBLICATIONS

Sirbu, et al., "NetBill: An Internet Commerce System Optimized for Network-Delivered Services", IEEE Personal Communications, vol. 2, Issue 4, Aug. 1995, pp. 34-39.
Slone et al., "Handbook of Local Area Networks", Auerbach Publications, 1991 (ISBN 0-7913-0868-5).
"American Express Services Go On-Line." *Mergers & Acquisitions*, v.29, n.5, p. 8, Mar. 1995.
"Banks Offer Customers Internet Access." *Multimedia Daily*, May 22, 1995. ISSN:: 1079-4212.
Everest, Gordon C. *Database Management*, Mc-Graw-Hill Series in Management Information Systems, 1986. ISBN: 0-07-019781-4.

"ExpressNet Bows (American Express Launches Online Service Called ExpressNet)." *Information Week*, n.514, p. 17, Feb. 13, 1995.
Miailovich, Jill. "QuickXpense Introduces Automatic Pre-Population of Expense Reports," *Business Wire*, s.1, p. 1, May 8, 1995.
"Online Service Allows Account Review (Block Financial Corp.)." *Card News*, v.9, n.21, p. 3, Oct. 31, 1994.
"On-Line Services Give Account Holders Transaction Info." *Newsbytes News Network*, Feb. 2, 1995.
"User's Guide for Quicken." (Version 2 for Windows), Intuit, p. 206, 1992.
Zutell, Irene. "AMEX Says On-Line Booking Keeps Travel Agents in the Loop," *Travel Agent*, Feb. 6, 1995. ISSN: 1053-9360.
The Cushing Group, Inc., "Introduction to Distributed Client/Server Computing with ObjectBroker," ObjectWorld San Francisco, Jul. 1994 (PowerPoint slides).
The Cushing Group, Inc., "Using CORBA to Integrate Legacy Systems," ObjectWorld Boston, Mar. 22, 1995 (PowerPoint slides).
The Cushing Group, Inc., "Lessons Learned Deploying a Large-Scale Distributed Object Computing Environment," ObjectWorld Boston, May 1996 (PowerPoint slides).
Michael L. Ronayne and Erik S. Townsend, "Preserving the past, designing the future," Object Magazine., Sep. 1995.
"Wells Fargo: Innovations in Customer Management," American Banker, Nov. 3, 1997.
Berkov, Barry, "CompuServe." Keynote address given at *Internet Telecom 95*. Geneva Arena, Geneva, Switzerland, Oct. 8, 1995.
Birrel, A. D., and Nelson, B., "Implementing Remote Procedure Calls," ACM Transactions on Computer Systems, vol. 2, No. 1, pp. 39-59 (1984).
*Business Example: A Case Study*. Slide Show. US:The Cushing Group, Inc., 1994-1997.
CORBAservices specification—v1.0, Mar. 1995. Available as pdf from http://cgi.omg.org/cgi-bin/doc?formal/97-02-08.pdf. Last access Jan. 30, 2003.
"DCE Means Business", Kathryn E. DeNitto, DCE Technology Manager, Mar. 20, 1995, http://www.opengroup.org/dce/, last accessed Feb. 26, 2003.
(Distributed Application Software: Architecture and Design . Slide Show. US:The Cushing Group, Inc., 1992-1993.
Edwards, Jeri, with Deborah DeVoe, "Wells Fargo Leads the Way to Internet Banking." *Three-Tier Client/Server at Work* 1997:107-130 (Ch. 6).
Edwards, Nigel, and Owen Rees, "Distributed Objects and the World Wide Web." (ANSA) Cambridge, UK, Architecture Projects Mgmt., Ltd., Aug. 24, 1994.
Samuel C. Kendall, Jim Waldo, Ann Wollrath and Geoff Wyant, "A Note on Distributed Computing", TR-94-29, Sun Microsystems, http://research.sun.com/techrep/1994/abstract-29.html, last access Feb. 24, 2003.
Orbix Advanced Programmer's Guide, Release 1.3. 1. Dublin, Ireland: IONA Technologies, Ltd., Feb. 1995.
The Orbix Architecture. Dublin, Ireland: IONA Technologies, Ltd., Aug. 1993.
Orbix.Programmer's Guide, Release 1.3. Dublin, Ireland: IONA Technologies, Ltd., Apr. 1995.
"Remote Procedure Call in a Distributed Computing Environment", The Open Software Foundation, 1990, http:// www.mit.bme.hu/~kiss/docs/dce/rpc.htmI, last accessed Feb. 26, 2003.

Ronayne, Michael L., and Erik S. Townsend, "A Case Study: Distributed Object Technology at Wells Fargo Bank" (Cushing Group white paper) US:The Cushing Group, Inc., 1996.

Sirbu, Marvin, and J.D. Tygar, "NetBill: An Internet Commerce System Optimized for Network-Delivered Services." *IEEE Personal Communications*, Aug. 1995:34-39.

Smith, Mark, "Interview with Bruce MacNaughton." *Windows & Net Magazine* Nov. 1996. Mar. 6, 2003 <http://www.winnetmag.com/Articles/Index.cfm?ArticleID=2823>.

Thomas, Gomer, ANSA Phase III: Trader Implementation with Orbix & ALLBASE (TC Talk, Jun. 1994). Cambridge, UK:Architecture Projects Mgmt. Ltd. Sep. 2, 1994.

Truncale, David, "CompuServe Brings NT Online." *Windows & Net Magazine*, Nov. 1996. Mar. 6, 2003 <http://www.winnetmag.com/Articles/Index.cfm?ArticleID=2822>.

*Wells Fargo Bank is First to Offer Customers Internet Access to Bank Account Balances*. San Francisco, CA: Wells Fargo Bank, May 18, 1995.

Seybold, Patricia, "Chapter 6—Provide a 360-Degree View." *Customers.com: How to Create a Profitable Business Strategy for the Internet and Beyond*. Toronto:Random House, 1998. 193-213.

Ronayne, Michael L., *The Business Case for Distributed Computing*. (Object World) San Francisco, CA:The Cushing Group, Inc., Aug. 1995.

\* cited by examiner

SYSTEM FOR ON-LINE FINANCIAL SERVICES USING DISTRIBUTED OBJECTS

This application is a continuation of U.S. patent application Ser. No. 09/520,140, filed Mar. 31, 2000, entitled SYSTEM FOR ON-LINE SERVICES USING DISTRIBUTED OBJECTS, which is a continuation of U.S. patent application Ser. No. 08/902,239, filed Jul. 29,1997, entitled SYSTEM FOR ON-LINE SERVICES USING DISTRIBUTED OBJECTS, which is now U.S. Pat. No. 6,131,115, issued Oct. 10, 2000, which is a continuation of U.S. patent application Ser. No. 08/580,074, filed Dec. 20,1995, entitled SYSTEM FOR ON-LINE FINANCIAL SERVICES USING DISTRIBUTED OBJECTS, which is now U.S. Pat. No. 5,706,442, issued Jan. 6, 1998.

BACKGROUND AND SUMMARY OF THE INVENTION

The present invention relates generally to client/server computer systems. Particularly, the present invention relates to a client/server architecture for delivering financial services to customers of various financial institutions.

Customers of various types of financial institutions such as banks, stock brokerages, credit card companies, and insurance companies often have a need to access information regarding recent account activity or their account balances. Typically, financial information is reported to customers in the form of monthly statements that list the account's activity and balance for the previous month. By the time these statements are processed and sent, they no longer reflect the current state of the account. Account balances may change on a daily basis for a variety of reasons including the addition of interest earned or the processing of a new transaction.

Customers in need of more timely information regarding their accounts usually have the option of calling a customer service representative of the financial institution to request a balance or activity report. Although the information is timely, it may be difficult or inconvenient to obtain. First, customers must call each institution from which they would like to obtain current information. When calling, they may need to wait for someone who can help. At other times, they may be required to traverse many levels of an automated attendant before reaching an option that will allow them to accomplish a specific task such as obtaining a current account balance. In either case, the information is presented verbally rather than in a written form that more closely resembles a statement. Finally, whether the information is communicated verbally or through a written statement, customers who wish to use the information in a computer program must enter it manually. In addition to the inconvenience, the process of manually entering the data is also error prone.

Customers of various financial institutions therefore, have a need to access recent financial information at their own convenience—preferably, from anywhere and at any time. Furthermore, customers have a need to see the financial data presented in an organized and understandable format similar to the monthly statement format with which customers are familiar. The present invention—Conductor$^{SM}$ System Architecture (Conductor)—supports a suite of on-line financial services from various financial services providers. Supported services include credit card account lookup and reporting, and checking and bill paying. In addition, customers and financial services providers may communicate with each other. Finally, the financial information obtained electronically may be downloaded directly to customers' personal computers for further processing. The need for manual data entry is eliminated.

The present invention is a sophisticated computer software system based on distributed system technology. Within the system, use of the TCP/IP protocol suite for communications with major components of the system allows the financial services to be accessed through the Internet. The same services may also be accessed directly through an on-line information service such as CompuServe®. Conductor supports a distributed "information cluster" located on the global Internet so it may be accessed at any time from around the world using any one of a number of presentation tools. A variety of financial services from a number of independent financial services providers are supported by the system so that users may review activity and balances relating to different types of accounts. The ability to use a variety of presentation tools to access a suite of financial services supported by a variety of financial services providers is unique to the present invention. The advantages of the present invention and others are explained further by the accompanying drawings and detailed description.

DETAIL DESCRIPTION OF PREFERRED EMBODIMENTS

The Conductor System Architecture (Conductor) and its related protocols provide a robust suite of on-line Interfaces for use by applications, financial service providers, Web (hyper-text transfer protocol—HTTP) servers, and other clients to obtain and manipulate financial information for users of the system. Applying principles of modularity and abstraction, distributed systems technologies are used to define the major components of Conductor and their interrelationships to allow delivery of diverse types of financial services over a wide area network. Sources of data may be as varied as the Interfaces to it. Financial information systems using the approach of Conductor are easily extensible because Conductor is based on a platform-portable, language-independent distributed object framework. Client components and server components work in concert to provide timely financial information to users of an on-line financial information system built using Conductor. Use of the distributed approach of a client/server model permits the easy integration of new services and providers for the system. For example, server components of Conductor may easily serve as back-end resources for existing on-line service providers. The distributed approach also allows applications running in the system to be accessible through a number of presentation tools or users interfaces (collectively, clients): for example, native Microsoft® Windows® applications, Web (hyper-text mark-up language—HTML) browsers, text-terminals, X.25 transactions, even voice telephony.

Figure 1:
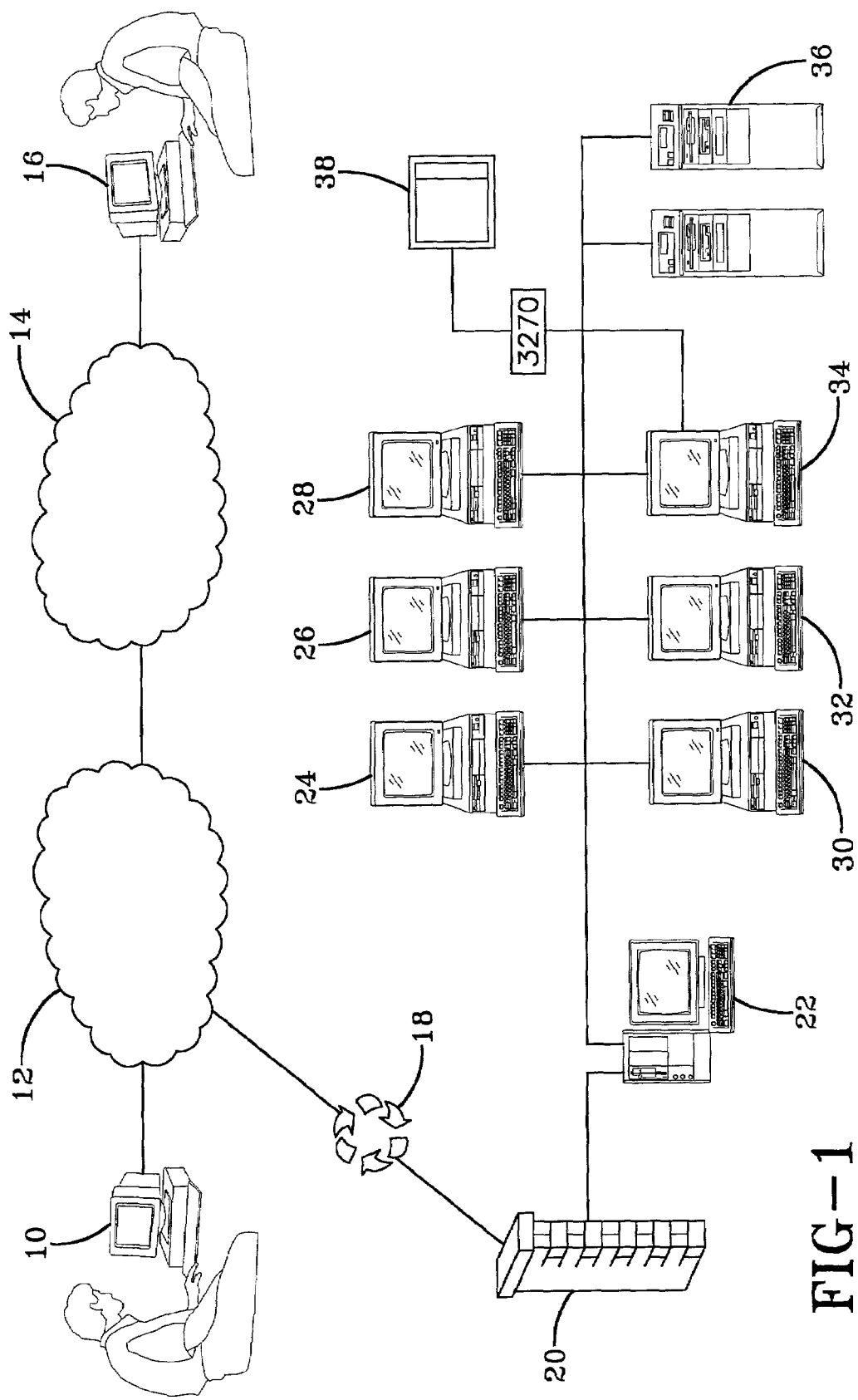
FIG. 1 is a diagram of the Conductor Network illustrating the components of a financial information service system based on the Conductor System Architecture.

Referring to FIG. 1, a diagrammatic representation of the Conductor Network is shown. The Conductor Network illustrates use of the Conductor System Architecture to provide a suite of financial services accessible through different user interfaces. Preferably, users connect to the suite of on-line financial services in the Conductor Network via the Internet 12. Methods for providing services via the Internet are well-known in the art and are not explained here. Host computers in the network are accessible world-wide from any site with TCP/IP name resolution and packet routing to the conductor.com domain. Preferably, host computers running the Windows NT™ Operating System and the UNIX® Operating System are used in the distributed environment. Clients and servers may run on any of twenty operating systems. Multiple user interfaces to applications that are part of the Conductor Network are implemented as different types of clients. As shown in FIG. 1, a user may communicate with a financial application via a Web (hyper-text markup language—HTML) browser 10 or via the CompuServe Information Service 14 using the CompuServe Information Manager for Windows® (WinCIM®) 16. Other methods of access may be used as well—for example, a native Microsoft® Windows® application. In addition, Conductor components may include financial services that are part of an on-line information service so that they are available only to subscribers of the on-line information service.

As shown in FIG. 1, packets destined for the Conductor Network are routed 18 to a Web Server 22 for processing. Because security is a significant issue for on-line financial information systems, a Firewall 20 is established between the Router 18 and the Web Server 22. User verification and data access may then occur in a secure environment. Separate user connect/data access protocols isolate internal/external networks. An indirect method of user identification is used to secure account numbers and sensitive data are passed via two-key encryption. Token passing is used for connected host identification.

The Conductor System Architecture is itself built on a Common Object Request Broker Architecture (CORBA)—compliant Distributed Object Computing Platform. This development platform is well-known in the art and is not explained here. Primary system components include Financial Object Servers, Distributed Name (or Name Lookup) Servers, and Database Servers. Other components include Communication, Security, and Logging servers. As shown in FIG. 1, a number of Distributed Name (or Name Lookup) Servers 24, 26, 28 and Financial Object Servers 30, 32, 34 may be in operation at one time. When running, these servers may communicate with a Legacy System 38 or other Database Servers 36 in order to respond to specific requests for information. Data requests may be serviced in any one of a number of ways. For example, data may be accessed using a Microsoft® SQL Server running on Windows NT™.

Clients and servers in a Conductor based system communicate according to an application-level protocol. The application-level protocol specifies how a client interprets data sent to it by a server. Differences in the implementation of various services are hidden behind this consistent API. Within applications, the protocol for communication between various components is a call-level API. When one part of the application needs something, it calls a procedural interface in another part. Such calls do not return until the procedure has executed so the flow of control is simple and direct. Extending these synchronous procedure calls across the network interface has the advantage of simplifying the access to distributed resources by elevating it to the level of standard procedural mechanisms familiar to a majority of developers.

Clients in a Conductor system have an object-oriented Application Programming Interface (API) to the distributed resources or services using a class-like construct called an "Interface" which groups operations and attributes. Interfaces are used by applications, financial service providers, Web (hyper-text transfer protocol—HTTP) servers, and clients to obtain and manipulate financial information for users of the system. Because clients know only the nature of the Interface, it may be implemented in any manner. For example, Interfaces may be implemented in one language and clients in another. The implementation of an Interface may then be altered at will without affecting any clients. As long as the protocol to the Interface is stable, the client implementation is stable.

Clients located anywhere on the global Internet ask for and bind to services by name. Clients locate Interfaces by naming a server which implements one, and they may do so from any site with a TCP connection to the Conductor domain (conductor.com). The names of servers are provided by a name lookup Interface which runs on the only host whose name clients need to know. Following name lookup, a client begins communication with a server capable of servicing the client's specific request. The access is synchronous and call-level using either C++, Smalltalk, or C. In other words, clients access services by making standard synchronous procedure calls. Client load is automatically apportioned among all ready object servers at lookup time.

There are several benefits to using name lookup to connect clients and servers. A name lookup layer isolates clients from the location or readiness of any individual server. Although the financial information system is based on the Internet Protocol (IP), clients are completely isolated from back-end data sourcing concerns and do not need to know the IP addresses of servers. Using this approach, servers may be added simply by connecting to the network, installing system and server software, and adding the machine name to the lookup database. Consequently, clients are not affected by database, network, operating system, hardware platform, or server architectural changes. For example, native 32-bit Windows® applications may use client-side abstraction libraries that hide details of binding to and executing calls on remote servers. Servers may be implemented on cheap, fast Intel-based Windows NT™ network servers and new servers may be added to the system by copying files over and adding the host name to a single locator file. The distributed nature of the system means that it is composed of relatively simple applications that implement a single Interface or a small group of Interfaces through which clients and servers communicate.

Another benefit of using name lookup to connect clients and servers is that servers may have geographical independence. Site independence for servers means that different servers may be developed and maintained by different financial services providers. User access mechanisms provided by clients remain the same so users may access new financial services using familiar methods.

The interface between clients and servers is binary. For various reasons, a binary interface to information and services is preferable to a textual one. Such an interface is more efficient and the data may be useful in more varied applications. Binary data may be converted to text for viewing by humans, sent in binary form to other providers, or retrieved in binary form and processed by a consumer application. Binary objects may be dragged off of a window and dropped into a finance application or they may be used to generate reports.

Figure 2:
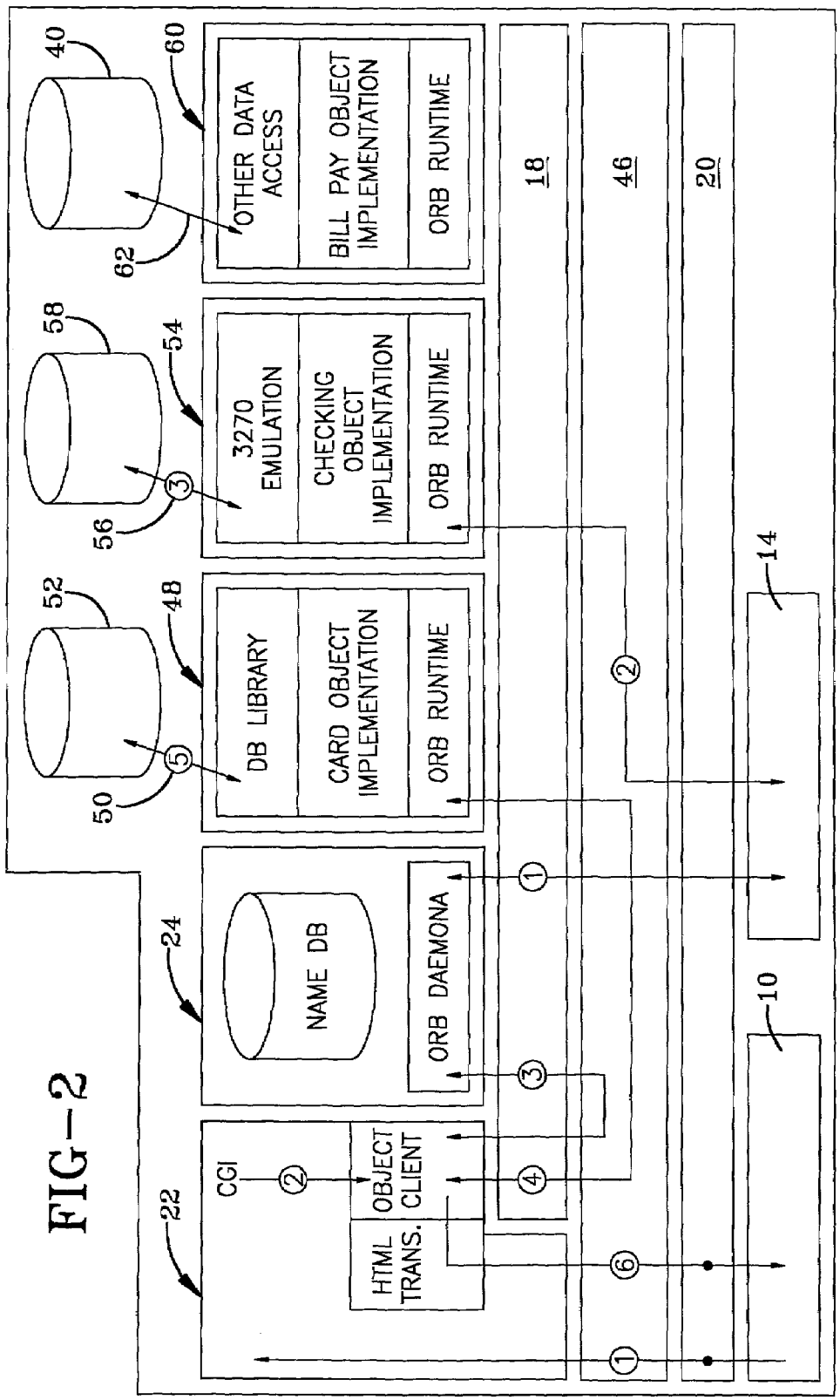
FIG. 2 is a block diagram of the Conductor System Architecture.

Referring to FIG. 2, a diagram of the client and server components of a financial information system based on the Conductor System Architecture is shown. Among the server components supported by Conductor are databases. For example, financial information of interest to users of the system is contained in different databases 52, 58, 40 within the distributed environment. Each database has its own access mechanism 50, 56, 62. As explained earlier, among the methods for accessing a system based on the architecture are a Web (hyper-text markup language—HTML) browser 10 that communicates through a Web Server 22 or a native Windows® application 14.

Regardless of the user interface or client in operation (e.g., Web browser 10 or Windows application 14), a financial information request that includes the name of a financial information service 42, 44 may be transmitted from the client 10, 14 to be processed by the name server 24. In the case of the Windows application 14, the financial information request 42 may be transmitted directly to the name server 24. In the case of the Web browser 10, the financial information request may be processed through a Web server 22 that communicates with the name server 24 to determine the location of the financial server to process the request. This approach therefore allows financial services to be implemented as objects and distributed throughout a wide area network such that they may be found through the name server 24.

The Firewall 20 increases system security of applications running in the Conductor environment. The TCP/IP protocol stack 46 is the Internet communication vehicle. Another Conductor component—the Object Request Broker (ORB)—is an "information bus" that connects clients to the servers or objects they need in a heterogeneous environment. By definition, an ORB is platform independent, language neutral, and may run in many networked environments. In other words, ORBs provide interoperability between applications on different machines in a heterogeneous environment. ORBs implemented in one language may communicate with those implemented in another, on a completely different hardware platform. The same is true for the object implementations to which the ORB provides access. Three example objects are shown in FIG. 2—a card object 48, a checking object 54, and a bill pay object 60. The objects serve as links between clients 10, 14 and data contained in the databases 52, 58, 40. The name server 24 performs the name lookup function for clients so they may establish communication with the financial object that performs the needed services.

Figure 3:
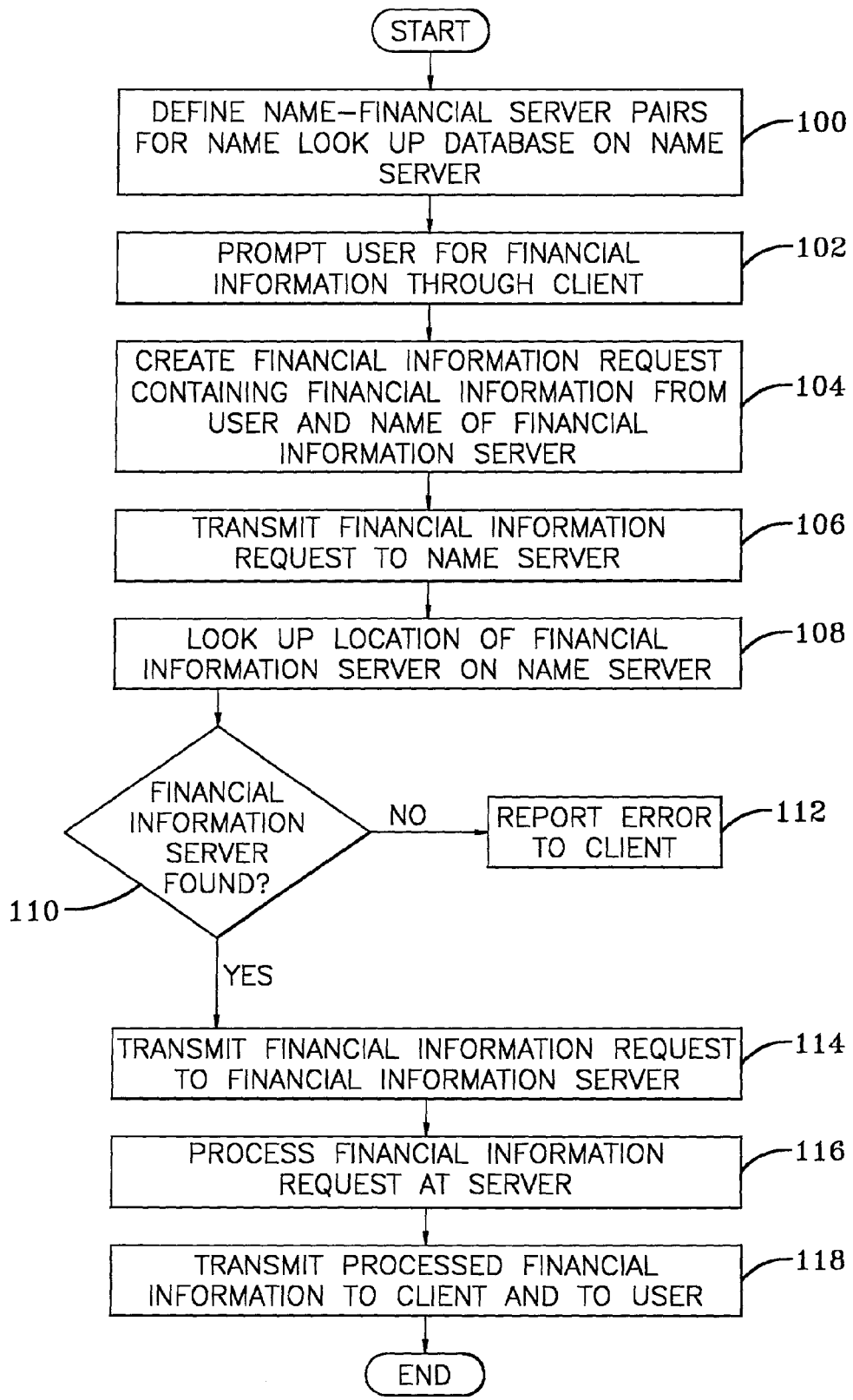
FIG. 3 is a flowchart of the primary steps of the present invention.

Referring now to FIG. 3, there is shown a flowchart of the primary steps of the present invention. Initially, name-financial server pairs are defined and loaded into a name lookup database on the name server 100. Name-server pairs may be added and/or modified as needed. Next, a user may be prompted for financial information such as the user's primary bank, account numbers, type of information desired (e.g., recent debit card transactions), etc. 102. The client with which the user is interacting (e.g., Web browser) may then create an electronic financial information request comprising the financial information provided by the user and the name of a financial information server that can provide the requested information 104. The electronic financial information request is then transmitted from the client to the name server 106. A database look-up is performed in accordance with the name contained in the financial information request 108. If the name of the financial information server is not found in the database 110, an error is reported to the client 112. If the name of the financial information server is found in the database 110, the financial information request is transmitted to the financial information server located during the database look-up 114. The financial information server then processes the financial information request 116 and the processed information is transmitted back to the client and ultimately, the user 118.

The distributed nature of the Conductor System Architecture means that a financial services system may be composed of relatively simple financial services applications accessible from one of several interfaces. The result of this is that each financial service application is easier to develop and maintain, and the Conductor-based financial services system at large is more flexible and robust. The present invention has been described in the form of preferred embodiments. However, several modifications and variations may be made to the invention and fall within the scope of the claims.

What is claimed is:

1. A system for providing to web users financial information from a plurality of financial institutions comprising:
    a plurality of financial information servers for accessing financial information from each of the plurality of financial institutions;
    a web server for accessing the plurality of financial information servers;
    a name server comprising pairs of names and locations of financial information servers for locating the financial information servers for processing financial information requests; and
    at least one web server process for performing the steps of:
        (a) receiving a financial information request from a client, the financial information request comprising the name of a financial information server for servicing the financial information request;
        (b) communicating with the name server to locate a financial information server for servicing the financial information request;
        (c) communicating with the financial information server for servicing the financial information request;
        (d) receiving the requested financial information from the financial information server for servicing the financial information request;
        (e) organizing the requested financial information for presentation at the client; and
        (f) transmitting the organized financial information to the client.

2. The system of claim 1 wherein the plurality of financial information servers are located at different geographic sites.

3. The system of claim 1 wherein the plurality of financial information servers are located at the same geographic site.

4. The system of claim 1 further comprising a data server for processing requests from the financial information server for servicing the financial information request.

5. The system of claim 1 wherein the requested financial information comprises account balance data.

6. The system of claim 1 wherein the requested financial information comprises financial transaction data.

7. The system of claim 1 Wherein the financial information request further comprises a name of a financial institution, an account number, and a type of information.

8. The system of claim 1 wherein the web server comprises a user verification component.

9. The system of claim 1 the client is selected from the group consisting of Microsoft® Windows™ applications, Web browsers, text-terminals applications, X.25 transactions, and telephony applications.

10. The system of claim 1 wherein the pairs of names and locations in the name server are loaded into a name lookup database.

11. The system of claim 1 wherein the financial information server for servicing the financial information request is saved at the web server.

12. A method for providing to web users financial information from a plurality of financial institutions comprising:
   (a) providing for access using a web server a plurality of financial information servers for obtaining financial information from each of a plurality of financial institutions;
   (b) providing for access by the web server a name server comprising pairs of names and locations of financial information servers for locating the financial information servers for processing financial information requests;
   (c) receiving at the web server from a client a financial information request comprising the name of a financial information server for servicing the financial information request;
   (d) sending from the web server to the name server a request to locate a financial information server for servicing the financial information request;
   (e) sending from the web server to the financial information server for servicing the financial information a request for financial information according to the financial information request from the client;
   (f) receiving at the web server the requested financial information from the financial information server for servicing the financial information request;
   (g) organizing at the web server the requested financial information for presentation at the client; and
   (h) sending the organized financial information from the web server to client.

13. The method of claim 12 wherein the plurality of financial information servers are located at different geographic sites.

14. The method of claim 12 wherein the plurality of financial information servers are located at the same geographic site.

15. The method of claim 12 wherein the financial information server for servicing the financial information request obtains the requested financial information from a database server.

16. The method of claim 12 wherein the requested financial information comprises account balance data.

17. The method of claim 12 wherein the requested financial information comprises financial transaction data.

18. The method of claim 12 wherein the financial information request further comprises a name of a financial institution, an account number, and a type of information.

19. The method of claim 12 wherein the web server comprises a user verification component.

20. The method of claim 12 wherein the requested financial information is saved at the web server.

21. The method of claim 12 wherein the client is selected from the group consisting of Microsoft® Windows™ applications, web browsers, text-terminals applications, X.25 transactions, and telephony applications.

22. The method of claim 12 wherein the pairs of names and locations at the name server are loaded into a name lookup database.

23. A system for processing requests for financial information from a plurality of financial institutions comprising:
   a plurality of financial information servers for accessing financial information from the plurality of financial institutions;
   a web server for receiving financial information requests from clients and receiving from the financial information servers financial information responsive to the financial information requests, the financial information requests comprising a name of a financial information server for processing the financial information request;
   a name server comprising pairs of names and locations of financial information servers for processing the financial information requests from clients by receiving from each request the name of the financial information server for processing the financial information request and returning location information for the financial information server for processing the financial information request,
   wherein a client of the web server receives from the web server financial information responsive to a financial information request, the financial information received by the web server which communicates with the financial information server for processing the financial information request according to the location information from the name server.

24. The system of claim 23 wherein the plurality of financial information servers are located at different geographic sites.

25. The system of claim 23 wherein the plurality of financial information servers are located at the same geographic site.

26. The system of claim 23 further comprising a data server for processing requests from the financial information server for servicing the financial information request.

27. The system of claim 23 wherein the requested financial information comprises account balance data.

28. The system of claim 23 wherein the requested financial information comprises financial transaction data.

29. The system of claim 23 wherein the financial information request further comprises a name of a financial institution, an account number, and a type of information.

30. The system of claim 23 wherein the web server comprises a user verification component.

31. The system of claim 23 wherein the financial information responsive to the financial information request is saved at the web server.

32. The system of claim 23 wherein the client is selected from the group consisting of Microsoft® Windows™ applications, web browsers, text-terminals applications, X.25 transactions, and telephony applications.

33. The system of claim 23 wherein the pairs of names and locations in the name server are loaded into a name lockup database.

34. A method for processing requests for financial information from a plurality of financial institutions comprising:
   (a) providing a plurality of financial information servers that obtain financial information the plurality of financial institutions;
   (b) providing for access by clients a web server that receives financial information requests and communicates with the financial information servers to receive financial information responsive to the financial information requests, the financial information requests comprising a name of a financial information server for processing the financial information request;
   (c) providing location information for a financial information server for processing a financial information request, the location information provided by a name server comprising pairs of names and locations of financial information servers that returns the location information for a financial information server for processing a financial information request in response to receiving a name of a financial information server; and (d) providing to a client of the web server financial information responsive to a financial information request, the financial information received by the web server which communicates with the financial information server for processing the financial information request according to the location information provided by the name server in response to receiving a name at a financial information server in the financial information request.

35. The method of claim 34 wherein the plurality of financial information servers are located at different geographic sites.

36. The method of claim 34 wherein the plurality of financial information servers are located at the same geographic site.

37. The method of claim 34 wherein the financial information server for servicing the financial information request obtains the financial information responsive to the financial information request from a database server.

38. The method of claim 34 wherein the financial information responsive to the financail information request is saved at the web server.

39. The method of claim 34 wherein the financial information responsive to the financial information request comprises account balance data.

40. The method of claim 34 wherein the financial information responsive to the financial information request comprises financial transaction data.

41. The method of claim 34 wherein the financial information request further comprises a name of a financial institution, an account number, and a type of information.

42. The method of claim 34 wherein the web server comprises a user verification component.

43. The method of claim 34 wherein the client is selected from the group consisting of Microsoft® Windows™ applications, web browsers, text-terminals applications, X.25 transactions, and telephony applications.

44. The method of claim 34 wherein the pairs of names and locations in the name server are loaded into a name lookup database.

* * * * *

UNITED STATES PATENT AND TRADEMARK OFFICE
CERTIFICATE OF CORRECTION

| | |
|---|---|
| PATENT NO. | : 7,032,008 B2 |
| APPLICATION NO. | : 09/932373 |
| DATED | : April 18, 2006 |
| INVENTOR(S) | : Anderson et al. |

It is certified that error appears in the above-identified patent and that said Letters Patent is hereby corrected as shown below:

<u>Column 6,</u>
Line 61, delete "Wherein" and insert -- wherein --.
Line 66, delete "The system of claim 1 the client" and insert -- The system of claim 1 wherein the client --.

<u>Column 10,</u>
Line 2, delete "financail" and insert -- financial --.

Signed and Sealed this

Twentieth Day of June, 2006

JON W. DUDAS
*Director of the United States Patent and Trademark Office*

UNITED STATES PATENT AND TRADEMARK OFFICE
CERTIFICATE OF CORRECTION

PATENT NO. : 7,032,008 B2 Page 1 of 1
APPLICATION NO. : 09/932373
DATED : April 18, 2006
INVENTOR(S) : Anderson et al.

It is certified that error appears in the above-identified patent and that said Letters Patent is hereby corrected as shown below:

In section (63), Related U.S. Application Data, please delete "Continuation of application No. 09/520,140, filed on Mar. 7, 2000, now Pat. No. 6,426,742, which is a continuation of application No. 08/902,239, filed on Jul. 29, 1997, now Pat. No. 6,131,115, which is a continuation of application No. 08/580,074, filed on Dec. 20, 1995, now Pat. No. 5,706,442." and insert --Continuation of application No. 09/540,140, filed Mar. 31, 2000, now abandoned, which is a continuation of application No. 08/902,239, filed on Jul. 29, 1997, now Pat. No. 6,131,115, which is a continuation of application No. 08/580,074, filed on Dec. 20, 1995, now Pat. No. 5,706,442.--

In column 1, lines 4-15, please delete "This application is a continuation of U.S. patent application Ser. No. 09/520,140, filed Mar. 31, 2000, entitled SYSTEM FOR ON-LINE SERVICES USING DISTRIBUTED OBJECTS, which is a continuation of U.S. patent application Ser. No. 08/902,239, filed Jul. 29, 1997, entitled SYSTEM FOR ON-LINE SERVICES USING DISTRIBUTED OBJECTS, which is now U.S. Pat No. 6,131,115, issued Oct. 10, 2000, which is a continuation of U.S. patent application 08/580,074, filed Dec. 20, 1995, entitled SYSTEM FOR ON-LINE FINANCIAL SERVICES USING DISTRIBUTED OBJECTS, which is now U.S. Pat. No. 5,706,442, issued Jan. 6, 1998." and insert --This application is a continuation of U.S. patent application Ser. No. 09/540,140, filed Mar. 31, 2000, entitled SYSTEM FOR ON-LINE SERVICES USING DISTRIBUTED OBJECTS, which is a continuation of U.S. patent application Ser. No. 08/902,239, filed Jul 29, 1997, entitled SYSTEM FOR ON-LINE SERVICES USING DISTRIBUTED OBJECTS, which is now U.S. Pat. No. 6,131,115, issued Oct. 10, 2000, which is a continuation of U.S. patent application Ser. No. 08/580,074, filed Dec. 20, 1995, entitled SYSTEM FOR ON-LINE FINANCIAL SERVICES USING DISTRIBUTED OBJECTS, which is now U.S. Pat No. 5,706,442, issued Jan. 6, 1998.--

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,032,008 B2 |
| APPLICATION NO. | : 09/932373 |
| DATED | : April 18, 2006 |
| INVENTOR(S) | : Anderson et al. |

It is certified that error appears in the above-identified patent and that said Letters Patent is hereby corrected as shown below:

In section (63), Related U.S. Application Data, please delete "Continuation of application No. 09/520,140, filed on Mar. 7, 2000, now Pat. No. 6,426,742, which is a continuation of application No. 08/902,239, filed on Jul. 29, 1997, now Pat. No. 6,131,115, which is a continuation of application No. 08/580,074, filed on Dec. 20, 1995, now Pat. No. 5,706,442." and insert -- Continuation of application No. 09/540,140, filed Mar. 31, 2000, now abandoned, which is a continuation of application No. 08/902,239, filed on Jul. 29, 1997, now Pat. No. 6,131,115, which is a continuation of application No. 08/580,074, filed on Dec. 20, 1995, now Pat. No. 5,706,442. --

In column 1, lines 4-15, please delete "This application is a continuation of U.S. patent application Ser. No. 09/520,140, filed Mar. 31, 2000, entitled SYSTEM FOR ON-LINE SERVICES USING DISTRIBUTED OBJECTS, which is a continuation of U.S. patent application Ser. No. 08/902,239, filed Jul. 29, 1997, entitled SYSTEM FOR ON-LINE SERVICES USING DISTRIBUTED OBJECTS, which is now U.S. Pat. No. 6,131,115, issued Oct. 10, 2000, which is a continuation of U.S. patent application Ser. No. 08/580,074, filed Dec. 20, 1995, entitlted SYSTEM FOR ON-LINE FINANCIAL SERVICES USING DISTRIBUTED OBJECTS, which is now U.S. Pat. No. 5,706,442, issued Jan. 6, 1998." and insert -- This application is a continuation of U.S. patent application Ser. No. 09/540,140, filed Mar. 31, 2000, entitled SYSTEM FOR ON-LINE SERVICES USING DISTRIBUTED OBJECTS, which is a continuation of U.S. patent application Ser. No. 08/902,239, filed Jul. 29, 1997, entitled SYSTEM FOR ON-LINE SERVICES USING DISTRIBUTED OBJECTS, which is now U.S. Pat. No. 6,131,115, issued Oct. 10, 2000, which is a continuation of U.S. patent application Ser. No. 08/580,074, filed Dec. 20, 1995, entitlted SYSTEM FOR ON-LINE FINANCIAL SERVICES USING DISTRIBUTED OBJECTS, which is now U.S. Pat. No. 5,706,442, issued Jan. 6, 1998. --

Signed and Sealed this

Thirtieth Day of January, 2007

JON W. DUDAS
*Director of the United States Patent and Trademark Office*